United States Patent
Hu

(10) Patent No.: US 11,620,906 B2
(45) Date of Patent: Apr. 4, 2023

(54) METHOD FOR ACCESSING SUPPLEMENTAL SENSOR DATA FROM OTHER VEHICLES

(71) Applicant: Direct Current Capital LLC, Wilmington, DE (US)

(72) Inventor: Chih Hu, Mountain View, CA (US)

(*) Notice: Subject to any disclaimer, the term of this patent is extended or adjusted under 35 U.S.C. 154(b) by 258 days.

(21) Appl. No.: 16/234,277

(22) Filed: Dec. 27, 2018

(65) Prior Publication Data

US 2019/0236955 A1  Aug. 1, 2019

Related U.S. Application Data

(60) Provisional application No. 62/610,689, filed on Dec. 27, 2017.

(51) Int. Cl.
  *G08G 1/16* (2006.01)
  *H04L 67/12* (2022.01)
  (Continued)

(52) U.S. Cl.
  CPC .......... *G08G 1/161* (2013.01); *G05D 1/0022* (2013.01); *G05D 1/02* (2013.01); *G05D 1/0212* (2013.01);
  (Continued)

(58) Field of Classification Search
  CPC ............ H01L 27/3218; H01L 27/3279; H01L 51/525; H01L 27/3276; H01L 27/3246; H01L 27/3216; G09G 3/3233; G09G 3/3225; G09G 2300/0842; G09G 2310/0251; G09G 2310/0262; G09G 2300/0452
  See application file for complete search history.

(56) References Cited

U.S. PATENT DOCUMENTS 8,965,677 B2  2/2015 Breed et al.
10,297,152 B1 * 5/2019 Patel ................ G08G 1/096766
(Continued)

FOREIGN PATENT DOCUMENTS

CN  101924924  12/2010
CN  105378815  3/2016
(Continued)

*Primary Examiner* — Rodney A Butler
(74) *Attorney, Agent, or Firm* — Polsinelli PC

(57) ABSTRACT

One variation of a method for accessing supplemental data from other vehicles includes, at an autonomous vehicle: recording a scan image of a scene around the autonomous vehicle at a first time; detecting insufficient perception data in a region of the scan image; in response to detecting insufficient perception data in the region, defining a ground area of interest containing the region and wirelessly broadcasting a query for perception data representing objects within the ground area of interest; in response to receiving supplemental perception data—representing objects within the ground area of interest detected by the second vehicle at approximately the first time—from a second vehicle proximal the scene, incorporating the supplemental perception data into the scan image to form a composite scan image; selecting a navigational action based on objects in the scene represented by the composite scan image; and autonomously executing the navigational action.

20 Claims, 5 Drawing Sheets

(51) Int. Cl.
*G08G 1/09* (2006.01)
*H04W 84/18* (2009.01)
*G05D 1/00* (2006.01)
*G05D 1/02* (2020.01)
*G08G 1/0967* (2006.01)
*G08G 1/0968* (2006.01)

(52) U.S. Cl.
CPC ... *G08G 1/09675* (2013.01); *G08G 1/096716* (2013.01); *G08G 1/096741* (2013.01); *G08G 1/096791* (2013.01); *G08G 1/096844* (2013.01); *G08G 1/162* (2013.01); *H04L 67/12* (2013.01); *H04W 84/18* (2013.01)

(56) References Cited

U.S. PATENT DOCUMENTS

| | | | |
|---|---|---|---|
| 2010/0284382 A1* | 11/2010 | Stahlin | G08G 1/096725 370/338 |
| 2014/0266655 A1 | 9/2014 | Palan | |
| 2015/0224933 A1* | 8/2015 | Higgins-Luthman | G06K 9/00825 348/118 |
| 2015/0241880 A1 | 8/2015 | Kim et al. | |
| 2016/0200317 A1* | 7/2016 | Danzl | B60W 10/10 701/25 |
| 2016/0229404 A1 | 8/2016 | Byun | |
| 2016/0278153 A1 | 9/2016 | Kim | |
| 2016/0358477 A1 | 12/2016 | Ansari | |
| 2017/0178498 A1 | 6/2017 | Mcerlean | |
| 2018/0136000 A1* | 5/2018 | Rasmusson, Jr. | G05D 1/0274 |
| 2019/0005374 A1* | 1/2019 | Shankar | B25J 9/1671 |
| 2019/0052842 A1* | 2/2019 | Du | G06K 9/00979 |
| 2019/0120964 A1* | 4/2019 | Luo | G01S 17/86 |

FOREIGN PATENT DOCUMENTS

| | | |
|---|---|---|
| CN | 105992134 | 10/2016 |
| CN | 109838423 | 2/2019 |

* cited by examiner

METHOD FOR ACCESSING SUPPLEMENTAL SENSOR DATA FROM OTHER VEHICLES

CROSS-REFERENCE TO RELATED APPLICATIONS

This Application claims the benefit of U.S. Provisional Application No. 62/610,689, filed on 27 Dec. 2017, which is incorporated in its entirety by this reference.

TECHNICAL FIELD

This invention relates generally to the field of autonomous vehicles and more specifically to a new and useful method for accessing supplemental data from other vehicles in the field of autonomous vehicles.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1A:
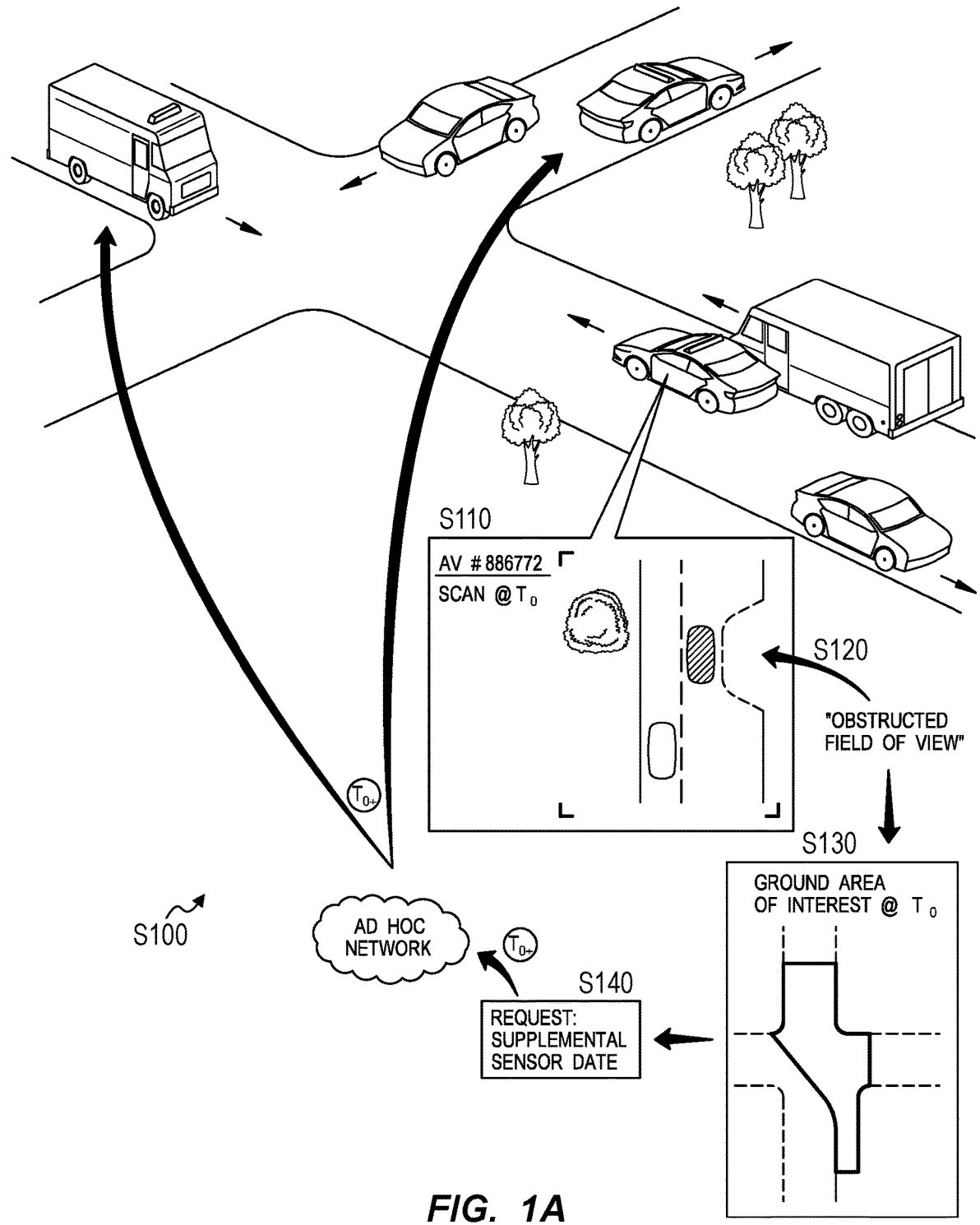
FIGS. 1A and 1B are flowchart representations of a method.
Figure 1B:
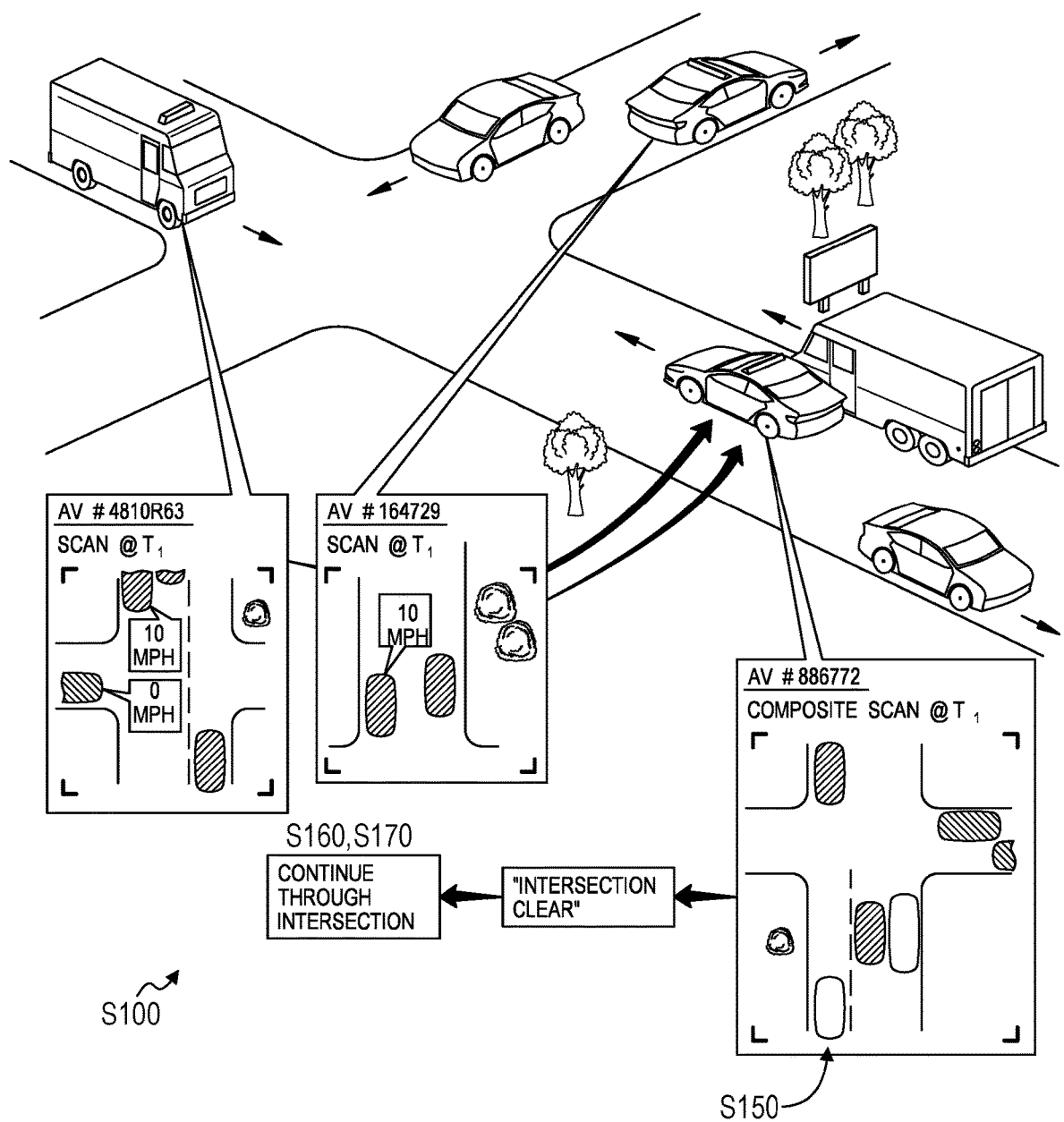

As shown in FIGS. 1A and 1B, a method for accessing supplemental data from other vehicles includes, at an autonomous vehicle: recording a scan image of a scene around the autonomous vehicle at a first time in Block S110; detecting insufficient perception data in a region of the scan image in Block S120; in response to detecting insufficient perception data in the region of the scan image, defining a ground area of interest containing the region of the scan image in Block S130 and wirelessly broadcasting a query for perception data representing objects within the ground area of interest in Block S140; in response to receiving supplemental perception data from a second vehicle proximal the scene, incorporating the supplemental perception data into the scan image to form a composite scan image in Block S150, the supplemental perception data representing objects within the ground area of interest detected by the second vehicle at approximately the first time; selecting a first navigational action based on objects in the scene represented by the composite scan image in Block S160; and autonomously executing the first navigational action in Block S170.

2. Application

Generally, autonomous vehicles in proximity to one another can each execute Blocks of the method S100 to form a local ad hoc wireless network and to share perception data (e.g., raw sensor data, object maps interpreted from sensor data) between themselves, which may enable some or all of these local autonomous vehicles to: achieve greater sensor redundancy; achieve more complete perceptions of their local scenes (e.g., locations, types, and trajectories of objects nearby); perceive oncoming vehicles and upcoming obstacles at further distances; and execute more informed—and even preemptive—navigational actions with greater confidence in less time.

2.1 Requesting Supplemental Perception Data

Figure 2:
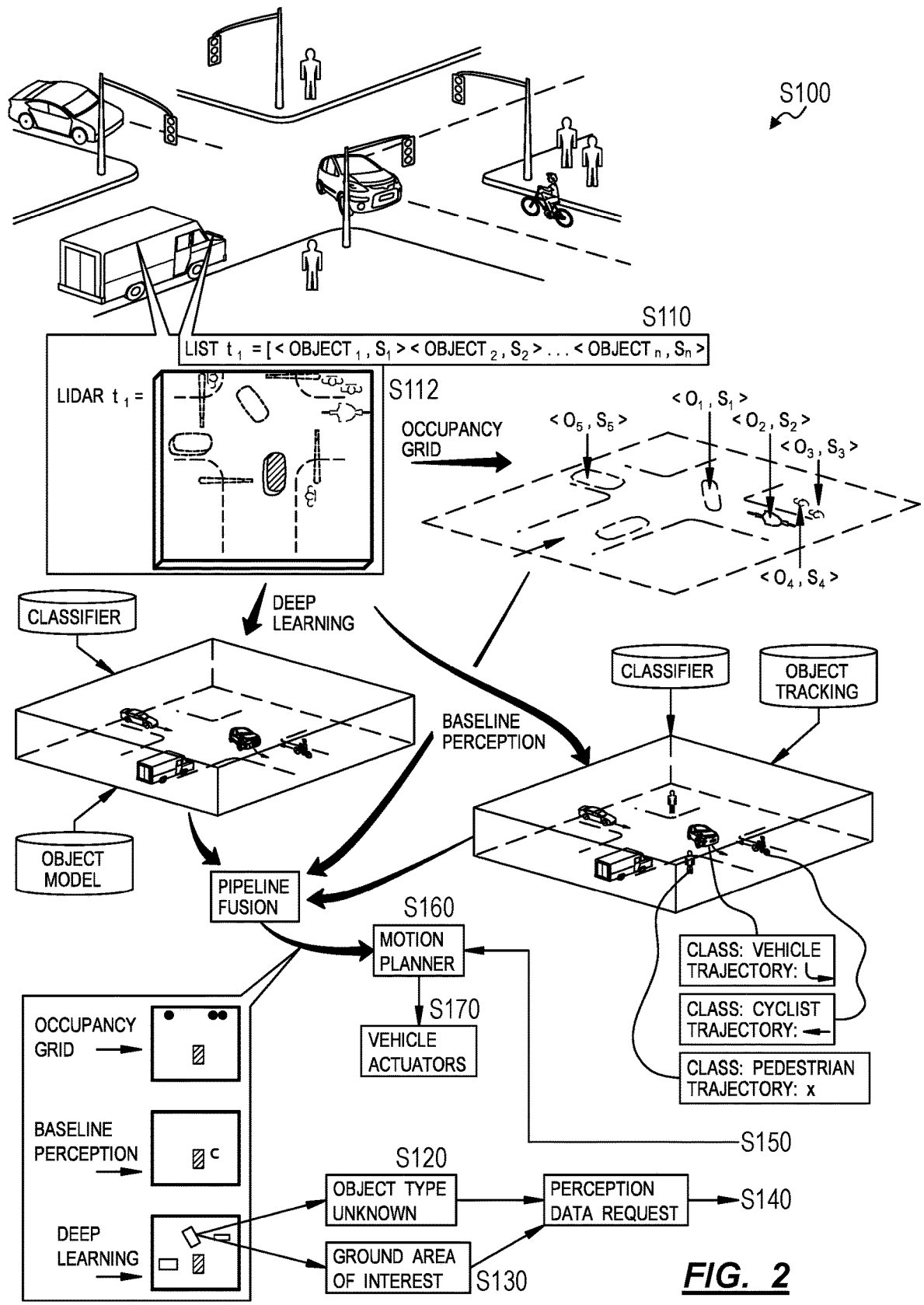
FIG. 2 is a flowchart representations of the method.

In particular, an autonomous vehicle autonomously navigating along a route can execute Blocks of the method S100 to request (or "pull") supplemental perception data from other vehicles nearby responsive to certain triggers, such as: low or insufficient sensor redundancy at the autonomous vehicle due to obstruction of fields of view of the sensors on the autonomous vehicle by external objects; in preparation for executing a particular navigational action (e.g., a right turn on red, an unprotected left turn); proximity to a common accident location; insufficient sensor data to confidently classify a type of an object detected in the scene near the autonomous vehicle; detection of a new mutable object of unknown trajectory in the scene near the autonomous vehicle; etc. as shown in FIG. 2. For example, the autonomous vehicle can: generate a query for raw sensor data, an object map, and/or other perception data representing objects within a particular ground area of interest in which the autonomous vehicle recorded insufficient depth map and/or photographic sensor data—over a particular time window—to verify these sensor data, confirm right of way to execute a navigational action, classify an object in the scene with more than a minimum confidence, and/or predict a trajectory of an object in the scene with more than a minimum confidence; and then transmit this query directly to other instrumented vehicles (e.g., other autonomous vehicles in the same or other autonomous vehicle fleet) over a local wireless network. Therefore, the autonomous vehicle can request supplemental perception data corresponding to a particular ground area of interest necessary for the autonomous vehicle to elect and execute a next navigational action or that enables the autonomous vehicle to elect and execute a next navigational action with greater confidence and lower probability of collision with an external object.

Upon receipt of this query, a second vehicle nearby can: retrieve georeferenced raw sensor data, object maps, or other perception data that intersects the particular ground area of interest and that was recorded during the particular time window specified in the query from local memory; and then broadcast these perception data back to the autonomous vehicle via the same local wireless network. Upon receipt of these supplemental perception data from the second vehicle nearby, the autonomous vehicle can: compile these supplemental perception data with sensor data collected by the autonomous vehicle itself to form a more complete, higher-resolution, and/or higher-confidence perception of the scene around the autonomous vehicle during the particular time window; elect a next navigational action (e.g., accelerate, brake, turn, or no change) based on this perception of the scene; and then autonomously execute this next navigational action.

2.2 Supplemental Perception Data Characteristics

Figure 3:
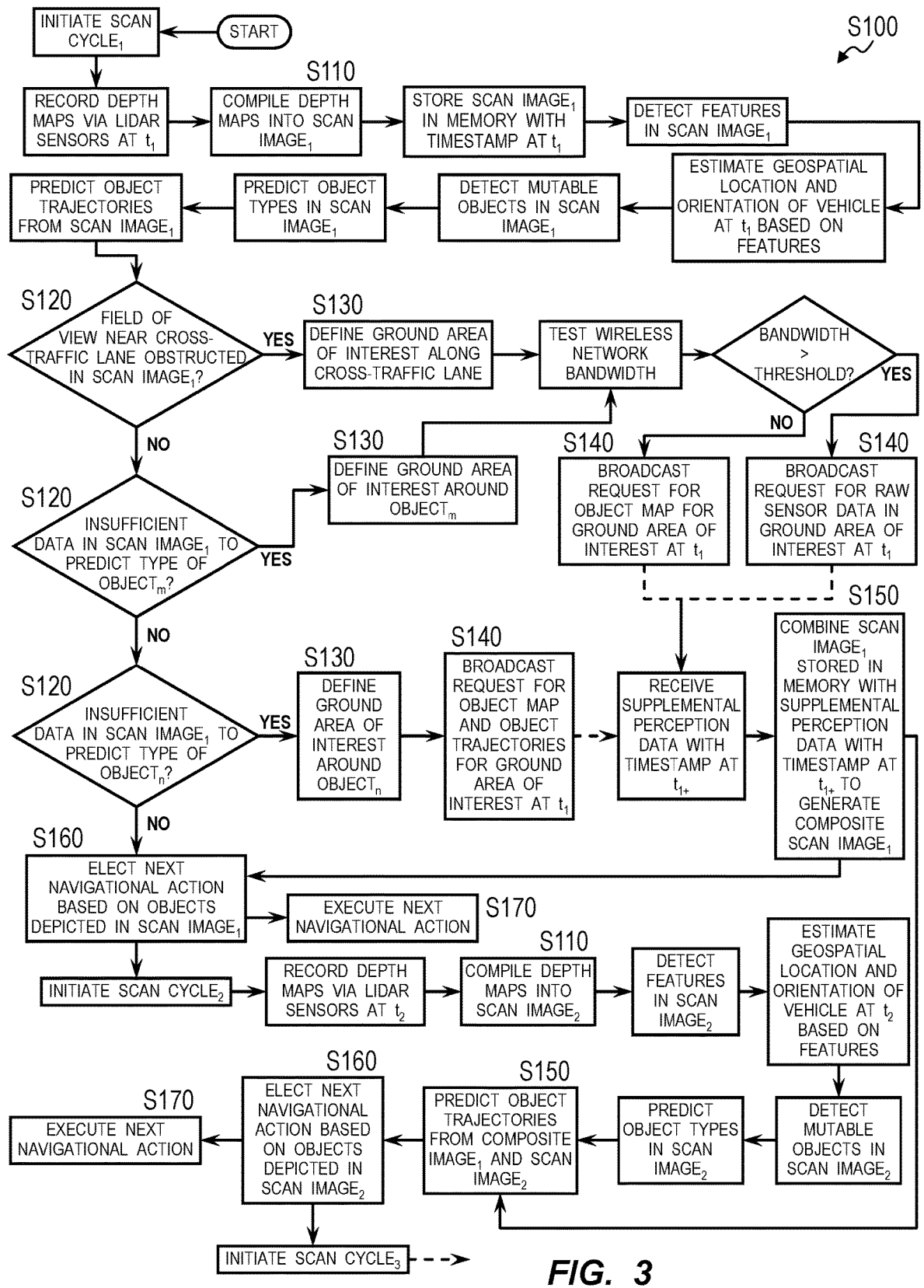
FIG. 3 is a flowchart representations of the method.

As shown in FIG. 3, the autonomous vehicle can also request perception data of a particular type, such as: raw depth map data (e.g., whole or partial LIDAR frames) and/or photographic images (e.g., whole or partial color images) if high-bandwidth wireless communications are supported by the local wireless network or if perception methods of other vehicles are unknown; or object maps containing types and geolocations of objects—derived from raw depth map and/ or photographic image data—if high-bandwidth wireless communications are not supported by the local wireless network or if perception methods of other vehicles are verified. By thus requesting more specific, selective sensor data from other vehicles nearby, the autonomous vehicle can limit a total volume of supplemental perception data transmitted from these other vehicles to the autonomous vehicle and thus limit bandwidth consumption of the wireless network.

Furthermore, the autonomous vehicle can request supplemental perception data beyond a particular ground area of interest in which insufficient perception data is available to the autonomous vehicle. For example, the autonomous vehicle can request supplemental perception data for a first ground area of interest in which the autonomous vehicle has access to sufficient perception data (e.g., sufficient sensor redundancy, confidence in a detected type of an object, confidence in a predicted trajectory type of an object) and a second ground area of interest in which the autonomous vehicle has access to insufficient perception data. Upon receipt of supplemental perception data spanning both of these ground areas of interest, the autonomous vehicle can: verify alignment between perception data generated by the autonomous vehicle and supplemental perception data—received from another vehicle—in the first ground area of interest; and then incorporate supplemental perception data corresponding to the second ground area of interest if supplemental perception data for the first ground area of interest are verified. The autonomous vehicle can therefore request supplemental perception data extending beyond a region in the scene around the autonomous vehicle for which the autonomous vehicle has access to insufficient perception data in order to enable the autonomous vehicle to verify integrity of these received supplemental perception data.

2.3 Transmitting Supplemental Perception Data

Figure 4:
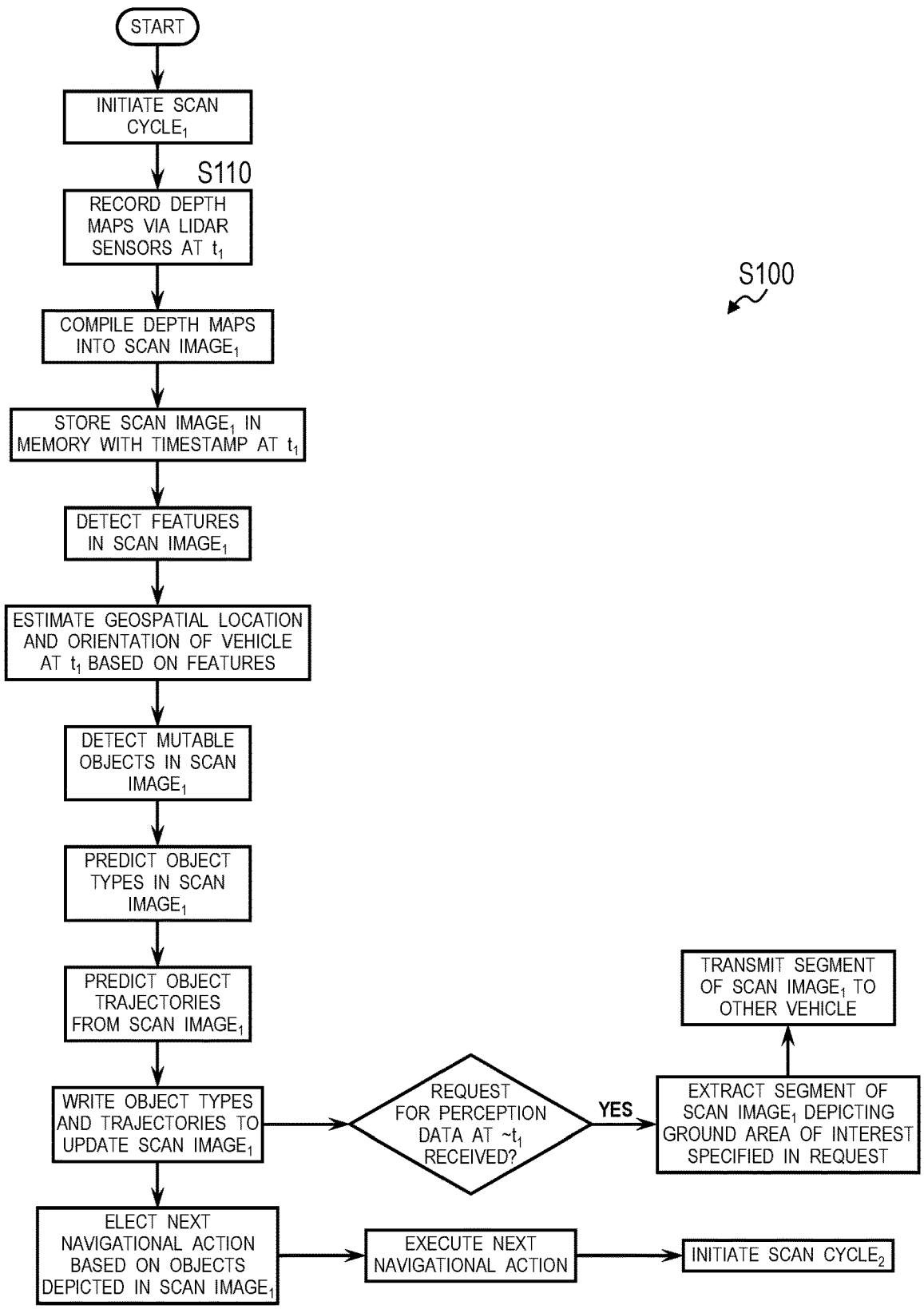
FIG. 4 is a flowchart representation of the method.

As shown in FIG. 4, the autonomous vehicle can also: record sensor data during operation, such as in the form of 2D color images, 3D color images, depth (e.g., LIDAR) scans, etc.; and broadcast all or segments of these sensor data. The autonomous vehicle can additionally or alternatively: transform these sensor data into object maps or other representations of the scene around the autonomous vehicle; and broadcast all or segments of these derived perceptions of the scene. Other autonomous vehicles nearby may then selectively access these perception data broadcast by the autonomous vehicle to supplement their own locally-generated perception data. Alternatively, the autonomous vehicle can: access a location, trajectory, and/or planned route of another vehicle; select a segment of its recent perception data that is relevant to navigation and/or perception by this other autonomous vehicle; and selectively broadcast (or "push") this segment of its recent perception data to this other autonomous vehicle. Yet alternatively, the autonomous vehicle can return all or select segments of its current perception data to this other autonomous vehicle when explicitly requested (or "pulled") by the other autonomous vehicle according to the method S100.

An autonomous vehicle executing Blocks of the method S100 can therefore: selectively request (or "pull") supplemental perception data from other vehicles nearby in order to augment its own perception of its environment; and separately or concurrently transmit its own perception data to other vehicles nearby in order to augment individual perceptions of these other autonomous vehicles.

To share perception data, these local autonomous vehicles (and/or other sensing-enabled vehicles nearby) can form an ad hoc wireless network and share perception data directly between autonomous vehicles via this ad hoc wireless network (e.g., rather than pass these perception data to a remote computer system via an established cellular network, which then distributes these data to other vehicles through the same cellular network).

The method S100 is described herein as executed by autonomous vehicles to send and receive supplemental perception data over a local ad hoc network in (near) real-time when certain trigger conditions are met, such as: proximity of another vehicle; insufficient sensor redundancy; proximity to flagged road locations; preparation for flagged navigational actions; etc. However, autonomous vehicles can also upload perception data to a remote computer system via a persistent wireless network (e.g., a cellular network), and these autonomous vehicles and the remote computer system can cooperatively execute Blocks of the method S100 substantially in real-time to selectively redistribute these perception data between these autonomous vehicles in order to augment their perceptions of their environments to enable higher-confidence and higher-accuracy autonomous operation.

3. Wireless Network

Local autonomous vehicles executing Blocks of the method S100 to send and receive supplemental perception data can form a mobile ad hoc wireless network. For example, each autonomous vehicle can function as a node in the wireless network and can connect to other nodes (i.e., other autonomous vehicles) nearby via wireless communication protocols to send, receive, and pass data throughout the wireless network. However, these autonomous vehicles can implement any other methods or techniques to create a self-configuring, dynamic ad hoc (or "mesh") wireless network over which supplemental perception data recorded by one autonomous vehicle may be redistributed to one or more other autonomous vehicles, which may then compile these supplemental perception data with their own sensor data to improve perception of local environments and improve speed and quality of navigational actions according to the method S100.

4. Autonomous Vehicle and Sensor Suite

Block S110 of the method S100 recites, recording a scan image of a scene around the autonomous vehicle. Generally, in Block S110, an autonomous vehicle accesses sensor data from various sensors arranged on or integrated in the autonomous vehicle—such as distance scans from multiple LIDAR sensors and/or two-dimensional images from multiple color cameras—recorded approximately concurrently by sensors arranged on the autonomous vehicle (and defining fields of view exhibiting some overlap over a distance range from the autonomous vehicle).

In one implementation, the autonomous vehicle includes: a set of LIDAR sensors, such as arranged on the top of the autonomous vehicle at each of the front, rear, left, and right of the autonomous vehicle. Each LIDAR sensor can output one three-dimensional depth map (or a "LIDAR frame")—such as in the form of a 3D point cloud representing distances between the LIDAR sensor and external surface within the field of view of the LIDAR sensor—per rotation of the LIDAR sensor (i.e., once per scan cycle). For example, a LIDAR sensor on the autonomous vehicle can output LIDAR frames at a rate of 20 Hz, wherein each LIDAR frame includes a 3D point cloud spacing a 360° field of view about a yaw axis of the autonomous vehicle and wherein each point in a LIDAR frame represents a distance from the LIDAR sensor to a surface in the field around the autonomous vehicle. Furthermore, in one variation in which the autonomous vehicle includes multiple LIDAR sensors arranged in different positions and/or orientations on the autonomous vehicle, each LIDAR sensor can output one LIDAR frame per scan cycle; and the autonomous vehicle can combine concurrent LIDAR frames received from these LIDAR sensors into one composite LIDAR frame per scan cycle based on known positions of these LIDAR sensors on the autonomous vehicle. The autonomous vehicle can then pass a LIDAR frame—from a single LIDAR sensor or combined from multiple LIDAR sensors—into the grid occupancy, baseline perception, and deep-learning pipelines described below and shown in FIG. 2.

The autonomous vehicle also includes a RADAR sensor arranged on the front of and facing outwardly from the front of the autonomous vehicle, configured to detect surfaces in its field of view (i.e., ahead of the autonomous vehicle), and configured to output a list of these surfaces and their positions once per scan cycle. For example, the RADAR sensor can define an approximately 2D field of view extending horizontally and outwardly from the front of the autonomous vehicle. Once per scan cycle (e.g., at a rate of 20 hz), the RADAR sensor can output an object list for objects detected in its field of view (e.g., up to 64 objects), such as including: an azimuthal angle relative to the RADAR sensor, a distance from the RADAR sensor, and a speed relative to the RADAR sensor (i.e., relative to the autonomous vehicle more generally) for each object in the object list. In one variation in which the autonomous vehicle includes multiple RADAR sensors arranged in different positions and/or orientations on the autonomous vehicle, each RADAR sensor can output one object list per scan cycle; and the autonomous vehicle can combine concurrent RADAR-based object lists received from these RADAR sensors into one composite object list per scan cycle based on known positions of these RADAR sensors on the autonomous vehicle. The autonomous vehicle can then pass a RADAR-based object list—from a single RADAR sensor or combined from multiple RADAR sensors—into the grid occupancy pipeline described below.

The autonomous vehicle can also include a set of color cameras, such as facing outwardly from the front, rear, left lateral, and right lateral sides of the autonomous vehicle. For example, each camera can output digital photographic images (e.g., color images, or "camera images") at a rate of 20 Hz.

The autonomous vehicle can additionally or alternatively include: a set of infrared emitters configured to project structured light into a field near the autonomous vehicle; a set of infrared detectors (e.g., infrared cameras); and a processor configured to transform images output by the infrared detector(s) into a depth map of the field. Similarly, the autonomous vehicle can include a set of infrared proximity sensors arranged along the perimeter of the base of the autonomous vehicle and configured to output signals corresponding to proximity of objects and pedestrians within one meter of the autonomous vehicle.

During operation, the controller can regularly access distance scans recorded by the set of LIDAR sensors, access 2D color images recorded by cameras, and/or access object lists and locations output by RADAR sensors arranged on the autonomous vehicle in Block S110. For example, the autonomous vehicle can compile these scan data of different types and in different formats into one scan image representing the field around the autonomous vehicle. The autonomous vehicle can also implement occupancy grid, baseline perception, and/or deep-learning perception techniques to: interpret locations of fixed and mutable objects in the scene from the scan image; classify types of these objects (e.g., vehicles, trucks, pedestrians, lane markers, road signs, traffic signals); predict states of these objects; and/or predict motion or trajectories of these objects (e.g., based on object types and object locations in preceding scan images).

The autonomous vehicle can also compare features detected in this current scan image to a localization map to determine the position and orientation of the autonomous vehicle in real space. The controller can also calculate a nominal path between the autonomous vehicle's current location and a planned route toward a specified destination based on a navigation map and the real position and orientation of the autonomous vehicle derived from the current scan image.

The autonomous vehicle can also determine (or "perceive") a context of a scene around the autonomous vehicle (e.g., whether the autonomous vehicle has right of way to continue along its planned route) from the scan image, such as based on types, states, and motion or trajectories of objects detected in the current scan image. Accordingly, the autonomous vehicle can: elect a next navigational action—such as to remain on or to deviate from the planned route—based on the context of the scene around the autonomous vehicle and its real position and orientation; and then manipulate actuators within the vehicle (e.g., accelerator, brake, and steering actuators) in order to autonomously execute the elected navigational action.

5. Supplemental Perception Data Transmission

The autonomous vehicle can therefore collect various types of sensor data during a scan cycle in Block S110. As described below, the autonomous vehicle can transmit raw sensor data (e.g., raw depth maps, raw color images) to other autonomous vehicles nearby via a wireless network, such as by: broadcasting these raw sensor data via a local ad hoc wireless network by default; or wirelessly transmitting these raw sensor data to a particular vehicle nearby when these raw sensor data intersect a ground area of interest explicitly specified by another vehicle in a request for supplemental perception data, as shown in FIGS. 1B and 4.

Alternatively, the autonomous vehicle can transmit derived perception data—such as in the form of an object map of mutable objects labeled with their locations, types, and/or trajectories near the autonomous vehicle—to other vehicles nearby.

5.1 Derived Perception Data

In one implementation, the autonomous vehicle broadcasts derived perception data that represents—predominantly or exclusively—mutable objects (i.e., non-stationary objects, such as other vehicles, pedestrians, etc.) to other vehicles nearby. For example, the autonomous vehicle can access: a localization map depicting georeferenced immutable objects, such as road surfaces, buildings, traffic and street signs, lane markers, curbs, etc., within a geographic region; and compare features in a current 3D image scan last generated by the autonomous vehicle to immutable features represented in the localization map to determine the autonomous vehicle's location and orientation in real space. However, other autonomous vehicles—such as in the same autonomous vehicle fleet—may have access to the same localization map and thus have access to types and locations of these same immutable objects in the geographic region. Therefore, features in the autonomous vehicle's scan data that represent immutable objects and surfaces in this geographic region may be redundant for these other autonomous vehicles, and additional scan data representing these immutable objects and surfaces may not substantially improve localization, scene perception, or navigation for these other autonomous vehicles. Thus, the autonomous vehicle can:

isolate features in the current scan image that differ from immutable objects and surfaces represented in the localization map, since these differing features may (predominantly) represent mutable objects in the scene around the autonomous vehicle; and selectively transmit perception data representing these mutable objects to other vehicles nearby, such as by pushing these perception data to these other vehicles or by returning these perception data to nearby vehicles when specifically requested.

In one example, the autonomous vehicle: constructs a 3D scan image of the field around the autonomous vehicle from depth maps recorded by LIDAR sensors on the autonomous vehicle during a current scan cycle; identifies objects in concurrent color images recorded approximately by cameras on the autonomous vehicle; projects the object annotations from these color images onto corresponding clusters of points in the 3D scan image; implements object tracking techniques to track (mutable) objects between a previous 3D scan image and the current 3D scan image and to derive velocities of these objects; and label objects in the current 3D scan image with their corresponding velocities. The autonomous vehicle can also: predict boundaries of these objects; insert the boundaries around corresponding clusters of points in the 3D scan image; and label these boundaries and/or corresponding clusters of points with georeferenced locations and orientations of these objects. The autonomous vehicle can further implement motion models to predict trajectories of these objects based on their types and insert predicted trajectories onto corresponding clusters of points (or corresponding objects) in the current 3D scan image. The autonomous vehicle can thus generate a 3D scan image that contains georeferenced representations of mutable and immutable objects, each labeled with its predicted type, state, 2D or 3D boundary, velocity, and/or predicted trajectory, etc.

In this example, the autonomous vehicle can also: implement localization techniques to align features in the current 3D scan image to georeferenced features in the localization map to determine a geospatial location and orientation of the autonomous vehicle at a time of the current scan cycle; isolate objects (e.g., or surfaces, points, features etc.) represented in the current 3D scan image that are offset from immutable surfaces represented in the localization map; isolate other objects identified by the autonomous vehicle as mutable; and compile these isolated objects—including their predicted types, type confidence scores, boundaries, velocities, and/or trajectories—into a compressed scan image that represents mutable objects (and unknown objects) in the scene around the autonomous vehicle at the current time. Therefore, this compressed scan image can form an "object map" depicting georeferenced locations of mutable objects and various characteristics of these mutable objects detected in sensor data recorded by the autonomous vehicle during the current scan cycle.

The autonomous vehicle can then transmit all or parts of the compressed scan image to other vehicles nearby over the ad hoc wireless network in order to supplement 3D scan images generated by these other vehicles at similar times. Therefore, in this example, the autonomous vehicle can compress a large 3D scan image down to a representation of a set of mutable objects and can transmit this compressed scan image to other autonomous vehicles nearby in order to reduce total volume of perception data broadcast by the autonomous vehicle over the ad hoc wireless network and thus limit bandwidth consumption on the wireless network.

The autonomous vehicle can additionally or alternatively filter perception data transmitted to another vehicle nearby based on a ground area of interest calculated for or received from this other vehicle. For example, upon receipt of a query for supplemental scan data representing a particular georeferenced ground area of interest from a second vehicle nearby—as described below—the autonomous vehicle can extract a segment of the compressed scan image that intersects this ground area of interest and then return this "truncated" scan image to the second vehicle, thereby limiting density of perception data transmitted to the second vehicle, limiting a total geospatial area represented by these perception data, and limiting bandwidth consumption on the wireless network when responding to requests for supplemental perception data for this second vehicle.

Furthermore, by transmitting a compressed or truncated scan image (e.g., an object map) depicting predicted types, type confidence scores, boundaries, velocities, and/or trajectories, etc. of mutable objects in the scene near the autonomous vehicle to other vehicles nearby, the autonomous vehicle can thus: serve pre-processed perception data (rather than raw sensor data) to another vehicle, thereby reducing processing time and processing power necessary for this other vehicle to incorporate the compressed or truncated scan image into its own locally-generated scan image.

However, the autonomous vehicle can pre-process scan data in any other way and can transmit these scan data in any other format to other vehicles on the local or ad hoc wireless network.

5.2 Pushing Perception Data

In one variation, the autonomous vehicle automatically broadcasts (or "pushes") supplemental perception data to other vehicles nearby by default and absent requests for specific supplemental perception data for particular ground areas of interest from these other vehicles.

In one implementation, the autonomous vehicle regularly broadcasts a scan image (e.g., a complete, truncated, or compressed scan image generated during one scan cycle, as described above) via the wireless network, such as once per scan cycle or intermittently (e.g., at a rate of 1 Hz). In this implementation, the autonomous vehicle can regularly broadcast (or "push") these perception data to the wireless network by default. Alternatively, the autonomous vehicle can broadcast these sensor data: when at least one autonomous vehicle is occupying a location within a threshold distance of the autonomous vehicle, such as a preset static range of 300 meters or a dynamic range proportional to a relative speed of the autonomous vehicle to the other autonomous vehicle; or when explicitly requested by another vehicle nearby.

In another implementation, the autonomous vehicle can: query other autonomous vehicles nearby (or the remote computer system) for their locations, speeds, directions of travel, and/or planned routes; predict whether perception data generated by the autonomous vehicle during the current or recent scan cycle may be relevant to these other autonomous vehicles; and then broadcast these perception data accordingly. For example, for a second vehicle nearby, the autonomous vehicle can calculate a ground area of interest for the second vehicle based on the speed, direction, and orientation of the second vehicle, such as an ellipse passing through: a first point 200 meters ahead and along the anteroposterior axis of the second vehicle; a second point 100 meters to the left of the second vehicle; a third point 100 meters to the right of the second vehicle; and a fourth point 50 meters behind the second vehicle given the second vehicle's current position and orientation. Alternatively, the autonomous vehicle can define a ground area of interest for the second vehicle extending longitudinally along a next one-mile segment of the second vehicle's planned route and laterally outward (by a short distance) from each intersection along this next segment of the second vehicle's planned route. In this example, the autonomous vehicle can then: calculate an intersection of a vertical projection of the ground area of interest for the second vehicle and the current 3D scan image (or other recent scan images) generated by the autonomous vehicle; crop the 3D scan image to this intersection; and automatically transmit this cropped segment of the 3D scan image to the second vehicle. The second vehicle can then append its own scan data within this cropped segment of the 3D scan image received from the autonomous vehicle to improve perception of its environment, thereby enabling the second vehicle to elect and execute a next navigational action with more spatially-complete information, with information spanning a longer period of time, and therefore with greater confidence.

The autonomous vehicle can also: simultaneously execute additional instances of this process to supply targeted supplemental perception data to other vehicles nearby; and repeat this process during each subsequent scan cycle to selectively broadcast supplemental perception data to these other vehicles.

5.3 Responding to Pull Requests for Perception Data

In another variation, the autonomous vehicle selectively returns supplemental perception data to another vehicle responsive to a request from this other autonomous vehicle (i.e., when supplemental perception data is "pulled" by this other vehicle).

In one implementation, the autonomous vehicle records raw sensor data, implements perception techniques to compile these sensor data into a scan image (e.g., a 3D scan image with object type, location, velocity, and trajectory annotations; or an object map), and executes a navigational action based on this scan image during one scan cycle, such as spanning a period of 50 milliseconds. In this implementation, the autonomous vehicle also: writes a timestamp for a particular time—such as corresponding to a start of the scan period—to the scan image in the local memory; tags the scan image with a geospatial location and orientation of the autonomous vehicle during the scan cycle; and stores this scan image in local memory, such as in a ten-second rolling buffer. Subsequently, the autonomous vehicle can receive a query from a second vehicle for perception data representing objects within a particular ground area of interest at approximately the particular time. If a geographic area represented by the scan image—stored in local memory—intersects this ground area of interest, the autonomous vehicle can then transmit the whole of the scan image (or a segment of the scan image intersecting the ground area of interest), the timestamp for the particular time, and the geospatial location of the autonomous vehicle at the particular time to the second vehicle. The autonomous vehicle can repeat this process to serve other scan images—stored in local memory and that intersect the ground area of interest and a greater time period specified in the query—to the second vehicle.

6. Supplemental Perception Data Requests

The autonomous vehicle can additionally or alternatively transmit requests for supplemental perception data to augment a scan image generated during a current or recent scan cycle.

In this variation, the autonomous vehicle can execute Blocks S120, S130, and S140 of the method, which recite: detecting insufficient perception data in a region of the scan image; in response to detecting insufficient perception data in the region of the scan image, defining a ground area of interest containing the region of the scan image; and wirelessly broadcasting a query for perception data representing objects within the ground area of interest, respectively. Generally, in Blocks S120, S130, and S140, the autonomous vehicle can selectively request (or "pull") supplemental perception data from another vehicle nearby when the autonomous vehicle determines that such supplemental perception data may be beneficial or necessary for the autonomous vehicle to perceive its local environment with sufficient completeness and accuracy and to enable the autonomous vehicle to elect and execute a next navigational action with sufficient confidence (e.g., confidence that the autonomous vehicle has right of way and that risk of collision with another object is low). In particular, the autonomous vehicle can execute Blocks S120, S130, and S140 to request access to supplemental perception data from other vehicles nearby via the local ad hoc wireless network when certain trigger conditions are met at the autonomous vehicle.

For example, in this variation, the autonomous vehicle can broadcast (or "push") a query to other vehicles nearby for supplemental perception data: if a portion of the autonomous vehicle's field of view is obstructed (e.g., by a truck in a lane adjacent the autonomous vehicle); if the autonomous vehicle has achieved less than a threshold sensor redundancy in a portion of its field of view; if the autonomous vehicle has access to insufficient density of sensor data in a region of a scan image to confidently predict a type or trajectory of an object; or if the autonomous vehicle detects another supplemental perception data trigger. In this example, the autonomous vehicle can transmit this query to a second vehicle nearby directly via the local ad hoc network or via a persistent wireless network (e.g., a cellular network connected to a remote computer system via the Internet). Upon receipt of this request, the second vehicle can execute methods and techniques described above to: isolate raw sensor data or derived perception data that temporally and spatially intersects this request (e.g., falls within a time window and ground area of interest specified in the request); and to return these raw or derived perception data to the autonomous vehicle in (near) real-time.

Therefore, in this variation, the autonomous vehicle can transmit a query to the second vehicle directly via a local ad hoc wireless network and then receive supplemental perception data from this second vehicle via the local ad hoc wireless network. The autonomous vehicle can then: combine these supplemental perception data received from the second vehicle with its own concurrent perception data (e.g., based on geospatial location and orientation associated with the supplemental perception data) in order to "fill in" its perception of its local environment; and then elect a navigational action based on this "filled in" (e.g., more complete and/or higher-resolution) representation of this environment.

The autonomous vehicle can also execute multiple instances of this process simultaneously to request supplemental perception data—for the same or different ground areas of interest—from multiple vehicles nearby and to incorporate supplemental perception data received from each of these into concurrent scan images generated by the autonomous vehicle, as shown in FIGS. 1A, 1B, and 3.

6.1 Trigger: Accessibility

In one implementation, the autonomous vehicle requests general supplemental data from other vehicles nearby when these other vehicles connect to the wireless network or otherwise come into wireless range of the autonomous vehicle.

For example, the autonomous vehicle can calculate a ground area of interest as a function of its speed, direction, and/or route in Block S130 and request supplemental data corresponding to this ground area of interest from other vehicles nearby in Block S140. In this example, the autonomous vehicle can define: an elliptical ground area of interest extending predominantly ahead of the autonomous vehicle by 50 meters when the autonomous vehicle is stopped at a traffic light; an elliptical ground area of interest extending predominantly ahead of the autonomous vehicle by 300 meters as the autonomous vehicle moves forward at 50 miles per hour; an elliptical ground area of interest extending predominantly to the right of the autonomous vehicle as the autonomous vehicle turns right or prepares to turn right; etc. Alternatively, while the autonomous vehicle executes a planned route, the autonomous vehicle can define a ground area of interest that extends forward from the autonomous vehicle's current position by one mile along the planned route and that extends laterally outward (e.g., by 200 meters) from each intersection along this next one-mile segment of the planned route in Block S130. The autonomous vehicle can then push a request for supplemental perception data representing this ground area of interest to other vehicles connected to the wireless network in Block S140. For example, the autonomous vehicle can: define the ground area of interest in the form of geospatial coordinates of vertices of the ground area of interest; request supplemental perception data in the form of raw sensor data if the wireless network is exhibiting high bandwidth at the current time; and request supplemental perception data in the form of an object map (e.g., containing types, geospatial locations, velocities, and trajectories of mutable objects) if the wireless network is exhibiting low bandwidth at the current time.

In a similar example, when the autonomous vehicle traverses a segment of highway at speed along its planned route, the autonomous vehicle can define a ground area of interest that extends along the planned route ahead of the autonomous vehicle and on the side of the highway occupied by the autonomous vehicle in Block S130. The autonomous vehicle can then broadcast a request for supplemental perception data from other vehicles traveling in the same direction on the same segment of highway ahead of the autonomous vehicle, such as up to two miles ahead of the autonomous vehicle. Upon receipt of this request, other vehicles can compare their fields of view with the ground area of interest specified by the autonomous vehicle; those with fields of view that intersect the ground area of interest can then selectively return truncated perception data corresponding to this ground area of interest to the autonomous vehicle via the wireless network. Upon receipt of these compressed and truncated perception data, the autonomous vehicle can append its own scan image recorded approximately concurrently by the autonomous vehicle with these external perception data in Block S150 in order to achieve perception of traffic and obstacles on this side of the highway at greater distances ahead of the autonomous vehicle, including traffic and obstacles outside of the autonomous vehicle's immediate field of view.

These supplemental perception data can thus enable the autonomous vehicle to identify traffic and obstacles at greater distances from the autonomous vehicle and possibly obscured from the autonomous vehicle's field of view, thereby enabling the autonomous vehicle to make navigational actions faster and with greater confidence. Furthermore, by requesting supplemental perception data that specifically represents mutable objects on and near the autonomous vehicle's planned route, the autonomous vehicle can access supplemental perception data that has already been processed, interpreted, and compressed to high-value representations of objects of interest by other vehicles, thereby limiting impact on wireless network bandwidth when these supplemental perception data are transmitted and limiting additional processing by the autonomous vehicle to incorporate these supplemental perception data into a scan image previously generated by the autonomous vehicle.

6.2 Trigger: Upcoming Navigational Action

In another implementation, the autonomous vehicle selectively requests supplemental perception data from other vehicles nearby when the autonomous vehicle prepares to execute a particular type of navigation action.

For example, the autonomous vehicle can implement a predefined set of navigational actions flagged for retrieval of supplemental perception data, such as: executing an unprotected left turn; turning right at an intersection with a red light; or exiting a parking garage; etc. In this example, when the autonomous vehicle approaches an intersection or is stopped at an intersection, a traffic light facing the autonomous vehicle is red, and the autonomous vehicle's planned route indicates a right turn at the intersection, the autonomous vehicle can define a ground area of interest that includes: the intersection; an oncoming left turn lane facing the autonomous vehicle and extending back from the intersection by 100 meters; and a cross-traffic lane extending leftward from the autonomous vehicle by 300 meters in Block S130. The autonomous vehicle can then broadcast a request for supplemental perception data within this ground area of interest to other vehicles nearby via the wireless network in Block S140. Other vehicles defining fields of view that intersect this ground area of interest may then return supplemental perception data to the autonomous vehicle via the wireless network, as described above.

These supplemental perception data may thus enable the autonomous vehicle to detect other vehicles approaching the right turn merge lane in front of the autonomous vehicle and along the autonomous vehicle's planned route—such as along the cross-traffic lane or from the left turn lane facing the autonomous vehicle—even if these other vehicles are not directly in the autonomous vehicle's field of view or too far from the autonomous vehicle to detect or identify directly. In particular, the autonomous vehicle can: leverage supplemental perception data received from other vehicles nearby to extend its perception of vehicles, pedestrians, and other mutable (e.g., moving) objects near the intersection; and then determine whether to delay or execute a right turn action at this intersection with greater confidence and with reduce probability of collision with oncoming traffic.

In this implementation, the autonomous vehicle can implement other rules, such as traffic density and/or traffic speed, to determine whether to query other vehicles nearby for supplemental perception data.

6.3 Trigger: Accident History

In another implementation, a navigation map (or the localization map, etc.) implemented by the autonomous vehicle is annotated with locations that trigger requests for supplemental perception data. In this implementation, the autonomous vehicle selectively requests supplemental perception data from other vehicles nearby when the autonomous vehicle approaches or occupies such trigger locations specified in the navigation map.

For example, the remote computer system (described above) can access various historical data, such as: locations at which local human operators occupying autonomous vehicles took manual control of their autonomous vehicles;

and/or locations (and severity, cost, etc.) of accidents involving manually-operated vehicles. The remote computer system can then: extrapolate discrete locations, intersections, lanes, and/or other road segments over which autonomous vehicles may be at higher risk for accidents or benefit in particular from supplemental perception data from other vehicles nearby; and populate the navigation map with supplemental perception data triggers at these discrete locations, intersections, lanes, and/or other road segments. The remote computer system can additionally or alternatively write supplemental perception data triggers to the navigation map at locations corresponding to particular road, intersection, obstacle, or other road condition types, such as railroad crossings, high-traffic pedestrian crossings, roads near schools, or intersections at which cross traffic does not stop, etc. The remote computer system can also assign predefined ground areas of interest to these supplemental perception data triggers in the navigation map.

During operation, when the autonomous vehicle approaches a location associated with a supplemental perception data trigger indicated in the navigation map, the autonomous vehicle can automatically broadcast a request for supplemental perception data—such as including a predefined ground area of interest defined for this location in the navigation map—to other vehicles nearby via the wireless network in Block S140. Upon receipt of this query, other vehicles nearby can stream supplemental perception data—representing objects and other surfaces within this ground area of interest—to the autonomous vehicle substantially in real-time; and the autonomous vehicle can combine these supplemental perception data with its own sensor data and leverage its augmented perception of its environment to enter and pass through this location with greater confidence and lower probability of collision with other objects.

In this implementation, once the autonomous vehicle moves past or out of a discrete location, intersection, lane, and/or other road segment associated with this supplemental perception data trigger in the navigation map, the autonomous vehicle can broadcast a prompt—to the native application—to cease transmission of supplemental perception data to these others vehicles.

6.4 Trigger: Field of View and Sensor Redundancy

In yet another implementation shown in FIG. 3, the autonomous vehicle selectively queries other vehicles nearby for supplemental perception data when fields of view of sensors on the autonomous vehicle are substantially obstructed.

Generally, optical sensors, such as LIDAR and color camera sensors, may be arranged on the autonomous vehicle in orientations that yield a minimum redundancy (e.g., overlapping fields of view) between these sensors at a minimum distance from the autonomous vehicle and under a nominal condition (e.g., when the autonomous vehicle is occupying an open field without tall objects nearby). However, in operation, overlapping regions of the fields of view of these sensors may be obstructed by tall objects (e.g., passenger vehicles, trucks, buildings) nearby as the autonomous vehicle navigates through a scene, such as along a roadway past buildings, through a parking lot past other vehicles, etc. Actual redundancy (e.g., or degrees of overlap between fields of view of these sensors) may therefore change, such as from moment to moment, as the autonomous vehicle autonomously navigates a planned route or toward a specified destination.

In a nominal condition in which no objects fall within a sensible range of the sensor suite, fields of view of adjacent LIDAR sensors and/or color cameras may exhibit known nominal overlap in three-dimensional space. For example, fields of view of two adjacent sensors: may not overlap at less than one meter from the sensors; may overlap laterally by two meters at a distance of five meters from the sensors; and may overlap laterally by twenty meters at a distance of forty meters from the sensors; etc. The autonomous vehicle can thus compare features (e.g., surfaces, objects) extracted from overlapping regions of two concurrent images output by these sensors in order to verify functions of these two sensors (e.g., to confirm that the presence of, position of, and/or a distance to an object detected in this region of a first image sufficiently matches features of a like object detected in the corresponding region of the second image.) (The autonomous vehicle can similarly compare features extracted from overlapping regions of fields of view of three or more sensors on the autonomous vehicle to verify functions of these sensors.) However, when the autonomous vehicle approaches an external object or surface—such as another vehicle, an overpass, a pedestrian, a traffic sign, a building, etc.—this external object or surface may obstruct overlapping regions of fields of view of these two (or more) sensors such that less or none of the fields of view of these sensors overlap, thereby reducing or eliminating redundancy between data output by these two sensors.

Therefore, the autonomous vehicle can selectively check alignment between overlapping regions of fields of view of sensors when sufficient overlap is detected; verify sensor data output by these sensors accordingly; and elect and execute navigational actions based on these verified, locally-generated sensor data. However, when the autonomous vehicle detects insufficient overlap between fields of view of these sensors, the autonomous vehicle can request supplemental perception data from other vehicles nearby in Block S140 and leverage these supplemental perception data to increase redundancy of data representing the fields of view of these sensors.

For example, if the autonomous vehicle is stopped at an intersection with a second vehicle (e.g., a truck) stopped just to the right of the autonomous vehicle or if the autonomous vehicle is navigating autonomously along a road with this second vehicle moving at a similar speed just to the right of the autonomous vehicle, this second vehicle may obstruct fields of view of optical sensors extending outwardly from the right side of the autonomous vehicle. In particular, while the second vehicle remains just to the right of the autonomous vehicle, this second vehicle may both: obstruct a field of view to the right of the autonomous vehicle from optical sensors arranged on the autonomous vehicle, thereby preventing the autonomous vehicle from directly detecting vehicles, obstacles, and road signs, etc. to the autonomous vehicle's right; and reduce or eliminate overlap between optical data collected by these optical sensors, thereby reducing or eliminating sensor data with which the autonomous vehicle may verify operation of these optical sensors.

Therefore, in this example, the autonomous vehicle can: define a ground area of interest extending to the right of the autonomous vehicle beyond this second vehicle in Block S130; and broadcast—to the ad hoc wireless network—a request for supplemental perception data corresponding to this ground area of interest in Block S140. Upon receipt of these supplemental perception data from other vehicles nearby, the autonomous vehicle can align these supplemental perception data with sensor data recorded locally in order to extend the autonomous vehicle's field of view beyond the second vehicle. The autonomous vehicle can also verify relative alignment of these sensors on the autonomous vehicle, accuracy of data and perception of these data recorded by these sensors on the autonomous vehicle, and accuracy and perception of supplemental perception data received from other vehicles based on alignment of like features in these local sensor data and concurrent supplemental perception data.

Therefore, in this implementation, the autonomous vehicle can leverage supplemental perception data received from other vehicles nearby to both augment its view of its environment and to augment redundancy of its sensor suite.

6.5 Scene Obfuscation

In a similar implementation shown in FIG. 3, the autonomous vehicle queries other vehicles nearby for supplemental perception data representing a ground area of interest near the autonomous vehicle but obscured by another object (e.g., a building, a truck, a passenger vehicle) in order to: extend the autonomous vehicle's field of view beyond this object; and account for other vehicles, pedestrians, etc. outside of the autonomous vehicle's immediate field of view when selecting and executing a next navigational action.

In one example, the autonomous vehicle: records sensor data (e.g., distances maps and/or color images) at a first time during a scan cycle; compiles these sensor data into a scan image in Block S110; identifies a region of the scan image that is devoid of data (or "empty") due to obfuscation of a field of view of a sensor on the autonomous vehicle by an external object in the scene at the first time in Block S120; defines a ground area of interest that intersects this region and extends beyond the external object opposite the autonomous vehicle in Block S130; and then broadcasts a request for supplemental perception data that represents objects and surfaces within this ground area of interest in Block S140. The autonomous vehicle may then receive—from a second vehicle opposite the external object from the autonomous vehicle—supplemental perception data recorded by the second vehicle at approximately the first time. The autonomous vehicle can then combine these supplemental perception data with the scan image generated by the autonomous vehicle at the first time to form a composite scan image that depicts both objects visible to the autonomous vehicle at the first time and objects not in the autonomous vehicle's line of sight (e.g., opposite the external object from the autonomous vehicle) at approximately the first time.

6.6 Object Classification

In another implementation shown in FIG. 3, the autonomous vehicle queries other vehicles nearby for supplemental perception data responsive to failure to classify a type of an object in a current scan image with at least a minimum confidence. In particular, if the autonomous vehicle detects features in the scan that may represent a discrete object (e.g., a cluster of points in a depth map that may represent vehicle, a pedestrian) but is unable to classify this object with sufficient confidence due to lack of sufficient data density in this region of the scan image, the autonomous vehicle can request supplemental perception data depicting this object. Similarly, if the autonomous vehicle detects features in the scan that may represent either one object or two discrete objects (e.g., a cluster of points in a depth map that may represent one truck or two discrete passenger vehicles) but is unable to classify these features as one or two objects with sufficient confidence due to lack of sufficient data density in this region of the scan image, the autonomous vehicle can request supplemental perception data depicting this object or objects.

In one example, the autonomous vehicle requests raw sensor data depicting this unclassified object. In this example, the autonomous vehicle records a first set of depth maps, via a set of depth sensors arranged on the autonomous vehicle, at approximately a first time during a scan cycle and compiles the first set of depth maps into a first scan image representing a set of surfaces in the scene that are visible to the autonomous vehicle at the first time in Block S110. If the autonomous vehicle then identifies a first cluster of points—in the first scan image—predicted to represent a single object but containing an insufficient quantity of points for identification of a type of the single object, such as with a deep-learning pipeline, the autonomous vehicle: calculates a georeferenced boundary containing the cluster of points based on a geospatial location of the autonomous vehicle at the first time; and transmits a query to nearby vehicles for georeferenced depth map data and/or raw color images depicting the georeferenced boundary. The autonomous vehicle may then receive—from a second vehicle nearby—a segment of a georeferenced raw depth map containing a second cluster of points corresponding to surfaces within this ground area of interest. Accordingly, the autonomous vehicle then: locates this second cluster of points in the scan image based on georeferenced received with this raw depth map to form a composite scan image; and then predicts a type of the object based on a combination of the first cluster of points and the second cluster of points in the composite scan image. In this example, the autonomous vehicle can implement a deep-learning perception pipeline to interpret a type of object (e.g., a vehicle, a pedestrian, a trashcan, a road sign, a bush) represented by this combined set of points in the composite scan image. The autonomous vehicle can additionally or alternatively implement computer vision, deep-learning, or artificial intelligence techniques to classify this object depicted in a raw, georeferenced color image received from the second vehicle.

After classifying the object, the autonomous vehicle can also access a motion model associated with the type of the object and predict a trajectory of this object based on the motion model and geospatial locations of this object (or points predicted to represent the object) in preceding scan images. The autonomous vehicle can then implement a path-planning model to elect a next navigational action that limits or reduces probability of collision with the object based on this predicted trajectory of the object.

Additionally or alternatively, the autonomous vehicle can request a class or type of this object, a georeferenced boundary around this object, and/or a trajectory of the object, etc. from other vehicles nearby, such as other vehicles closer to this object than the autonomous vehicle.

6.7 Unknown Object Trajectory

In a similar implementation shown in FIG. 3, responsive to detecting a new (moving) object in the scene around the autonomous vehicle, the autonomous vehicle queries other vehicles nearby for supplemental perception data representing this new object in order to enable the autonomous vehicle to predict the object's velocity and trajectory without previous knowledge of the position or velocity of the object.

In one example, the autonomous vehicle: generates a first scan image during a current scan cycle based on sensor data recorded at approximately a first time; identifies a particular object in the scene first detected by the autonomous vehicle in this first scan image but unrepresented in (i.e., absent from) scan images generated during previous scan cycles in Block S120; defines a ground area of interest containing the particular object in Block S130; and then wirelessly broadcasts a query for trajectories of objects within the ground area of interest in Block S140. The autonomous vehicle may then receive—from a second vehicle nearby—supplemental perception data including a predicted trajectory of the particular object (and its predicted type and geospatial location)

estimated by the second vehicle based on sensor data recorded by the second vehicle over a series of its own scan cycles up to approximately the first time. The autonomous vehicle can then annotate a representation of the particular object in the first scan image with the trajectory of the particular object received from the second vehicle.

However, the autonomous vehicle can request supplemental perception data from other vehicles in any other way and in response to any other one or more triggers in Blocks S130 and S140.

Furthermore, once the autonomous vehicle has cleared all triggers—such as by moving outside of a supplemental perception data location or completing a navigational action associated with a supplemental perception data trigger—the autonomous vehicle can: cease querying other vehicles on the network for supplemental scan data; and can instead transition to relying on sensor data collected locally to determine its location and orientation and to elect a next navigational action.

7. Derived Perception v. Raw Sensor Data

In the foregoing implementations, the autonomous vehicle can request raw sensor data and/or derived perception data from other vehicles in order to augment its own perception of its environment.

7.1 Raw Sensor Data

In one example, the autonomous vehicle records a first set of depth maps, via a set of depth sensors arranged on the autonomous vehicle, at approximately a first time during a scan cycle and compiles the first set of depth maps into a first scan image representing a set of surfaces in the scene that are visible to the autonomous vehicle at the first time in Block S110. The autonomous vehicle then wirelessly broadcasts a query for raw depth map data that intersects the ground area of interest and that was recorded at approximately the first time. The autonomous vehicle may then receive from a second vehicle nearby: supplemental perception data including a segment of a raw depth map that intersects the ground area of interest and that was recorded by the second vehicle at a second time approximating the first time (e.g., within 100 milliseconds of the first time); and a geospatial location of the second vehicle at the second time. The autonomous vehicle can then: locate this segment of the raw depth map received from the second vehicle in the scan image based on the geospatial location of the second vehicle at the second time; and implement occupancy grid, baseline perception, and/or deep-learning perception pipelines to interpret types, locations, velocities, and/or trajectories of objects depicted in the resulting composite scan image at approximately the first time.

7.2 Derived Perception Data

Alternatively, the autonomous vehicle can request derived supplemental perception data, such as in the form of an object map derived from raw sensor data by another vehicle. For example, the autonomous vehicle can: record a first set of depth maps, via a set of depth sensors arranged on the autonomous vehicle, at approximately a first time; record a first set of photographic images, via a set of cameras arranged on the autonomous vehicle, at approximately the first time; and then implement computer vision, deep-learning, and/or artificial intelligence techniques to generate a scan image including a first object map specifying types and georeferenced locations of a first set of objects within the scene at approximately the first time based on the first set of depth maps and the first set of photographic images. In response to detecting insufficient data in a region of the scan image, in Block S120, the autonomous vehicle can define a ground area of interest intersecting this region and then wirelessly broadcast a query for types, locations, velocities, and/or predicted trajectories of objects within this ground area of interest at approximately the first time. The autonomous vehicle may then receive—from a second vehicle—supplemental perception data in the form of a second object map segment: generated by the second vehicle based on perception data recorded by the second vehicle at approximately the first time (e.g., within 100 milliseconds of the first time; within one 50-millisecond scan cycle of the first time); and specifying types, locations, velocities, and/or predicted trajectories of a second set of objects within the ground area of interest at approximately the first time. The autonomous vehicle can then insert the second object map segment received from the second vehicle into the first object map generated by the autonomous vehicle to form a composite scan image depicting both objects detected by the second vehicle but not the autonomous vehicle and objects detected by the autonomous vehicle itself.

In this implementation, the second object map segment can also define a georeferenced boundary of each object in the second set of objects; and the autonomous vehicle can project these object boundaries into the first object map. The autonomous vehicle can also adjust these boundaries based on the autonomous vehicle's confidence in derived perception data received from the second vehicle. For example, the autonomous vehicle can insert the second set of objects into the first object map with the georeferenced boundary of each object in the second set of objects expanded by a buffer distance. In this example, the autonomous vehicle can: set a buffer distance to a first (minimal) distance if the second vehicle is associated with the same autonomous vehicle fleet as the autonomous vehicle and is executing an updated perception pipeline to detect, classify, and track objects nearby; set the buffer distance to a second distance greater than the first distance responsive to association of the second vehicle with an autonomous vehicle fleet different from that of the first autonomous vehicle but historically exhibiting high object perception accuracy; and set the buffer distance to a third distance greater than the second distance responsive to association of the second vehicle with an autonomous vehicle fleet different from that of the first autonomous vehicle and historically exhibiting poor object perception accuracy.

7.5.3 Derived Perception v. Raw Sensor Data Selection

In this variation, the autonomous vehicle can selectively request raw sensor data and derived perception data based on wireless connectivity and/or bandwidth limitations on the wireless network, as shown in FIG. 3. For example, the autonomous vehicle can: measure a bandwidth of a local wireless network at approximately a first time during a scan cycle; and wirelessly broadcast—via the wireless network—a query for derived perception data including types and locations of objects within a ground area of interest (e.g., an object map) at approximately the first time if wireless connectivity is poor and/or if bandwidth of the local wireless network falls below a threshold bandwidth at approximately the first time. However, if wireless connectivity is good and/or if bandwidth of the local wireless network exceeds the threshold bandwidth at approximately the first time, the autonomous vehicle can instead broadcast a query for raw sensor data intersecting the ground area of interest and recorded at approximately the first time.

8. Supplemental Perception Data Verification

In one variation, the autonomous vehicle requests supplemental perception data that extends beyond a region of a scan image for which the autonomous vehicle has access to insufficient perception data. Upon receipt, the autonomous vehicle: verifies presence and alignment of known objects in a high-data-density section of the scan image with like objects represented in a first segment of these supplemental perception data; and then incorporates a second segment of these perception data—corresponding to a low-data-density section of the scan image—into the scan image responsive to verification of the first segment of the supplemental perception data. However, if the autonomous vehicle fails to verify the first segment of the supplemental perception data, the autonomous vehicle can: discard these supplemental perception data in their entirety; incorporate these supplemental perception data into the concurrent scan image but labeled with lower-confidence values; or incorporate these supplemental perception data with larger avoidance (or "buffer") zones into the concurrent scan image.

In one example, the autonomous vehicle: identifies a first region of the current scan image devoid of data due to obfuscation of a field of view of a sensor on the autonomous vehicle by an external object in the scene at a first time; identifies a second region in the scan image containing sufficient (e.g., high-density, high resolution, higher redundancy) perception data; defines a ground area that includes a first segment containing the first region of the scan image and a second segment containing the second region of the scan image; and transmits a query for supplemental perception data in this ground area of interest. The autonomous vehicle may then receive—from a second vehicle nearby—a first perception data set representing the first segment of the ground area of interest and a second perception data set representing the second segment of the ground area of interest detected by the second autonomous vehicle at approximately the first time. The autonomous vehicle can then: verify the supplemental perception data based on alignment between the second perception data set and features detected in the second region of the scan image; and combine the scan image and the first perception data set to form a composite scan image in response to verification of the supplemental perception data. Otherwise, the autonomous vehicle can discard or deprioritize these supplemental perception data.

9. Delayed Access to Supplemental Perception Data

In another variation, the autonomous vehicle waits for supplemental perception data from another vehicle if requested perception data is not currently available from another vehicle but is predicted to be available in the near future (e.g., within the next ten seconds).

In one example, the autonomous vehicle autonomously navigates to a stop at a first location at a first time; generates a first scan image based on sensor data recorded at approximately the first time; detects a region of insufficient data in the first scan image; and the broadcasts a request for supplemental perception data within this region. At a second time succeeding the first time (e.g., by three seconds), the autonomous vehicle may receive a response from a second vehicle nearby that the ground area of interest is not currently in the second vehicle's field of view which is predicted to fall into its field of view at a third time succeeding the first time (e.g., five seconds after the first time). If a difference between the first time and the third time remains below a threshold wait time (e.g., ten seconds), the autonomous vehicle can remain stopped at the first location and download supplemental perception data depicting the ground area of interest from the second vehicle near (e.g., soon after) the third time. While waiting for these supplemental perception data, the autonomous vehicle can continue to generate scan images during subsequent scan cycles; upon receipt of supplemental perception data from the second vehicle around the third time, the autonomous vehicle can combine these supplemental perception data with concurrent scan images generated by the autonomous vehicle. The autonomous vehicle can then autonomously navigate away from the first location following the third time based on objects and scene context derived from these composite scan images and cease access to supplemental perception data from the second vehicle accordingly.

10. Data Combination

Block S150 recites, in response to receiving supplemental perception data from another vehicle proximal the autonomous vehicle, incorporating the supplemental perception data into the scan image to form a composite scan image. Generally, in Block S150, the autonomous vehicle compiles supplemental data received from other vehicles with sensor data recorded locally to enlarge and/or enrich its view of an environment around the autonomous vehicle.

As described above, autonomous vehicles can insert geolocation tags into supplemental perception data before broadcasting these supplemental perception data to the ad hoc wireless network or to a particular autonomous vehicle responsive to a supplemental perception data request. Upon receipt of supplemental perception data, an autonomous vehicle can thus align these supplemental perception data to its own sensor data recorded locally at approximately the same time (e.g., within two seconds of recordation of the supplemental perception data) based on geolocation tags in these supplemental perception data to form a composite sensor image.

In one example, after generating a first scan image based on sensor data recorded at a first time, the autonomous vehicle stores the first scan image—timestamped with the first time—in local memory. The autonomous vehicle repeats this process during each subsequent scan cycle to generate a sequence of timestamped scan images and stores these scan images in local memory (e.g., in a ten-second rolling buffer). During this period of time, the autonomous vehicle can request supplemental perception data for a ground area of interest at the first time and may receive a first set of supplemental perception data—recorded by a second vehicle at a second time—from the second vehicle at a third time succeeding the first time (e.g., by three seconds). Upon receipt of this first set of supplemental perception data, the autonomous vehicle can retrieve the first scan image from local memory and incorporate the first set of supplemental perception data into the first scan image to form the composite scan image based on temporal proximity of the first scan image to the first set of supplemental perception data. Until a change in the scene or the location of the autonomous vehicle eliminates a region of insufficient perception data in a scan image generated by the autonomous vehicle, the autonomous vehicle can preserve this request for supplemental perception data and can repeat this process to inject supplemental perception data received from one or more other vehicles into concurrent scan images stored in local memory on the autonomous vehicle.

The autonomous vehicle can thus generate a sequence of composite scan images that depict the scene around the autonomous vehicle during preceding scan cycles. The autonomous vehicle can also: detect and track an object in this sequence of past composite scan images; estimate a trajectory of the object based on changes in its geospatial locations during this sequence of previous composite scan images; verify this estimated trajectory based on a difference between the predicted and actual geospatial location of the object during the current scan cycle; and then extrapolate this trajectory forward into the future if validated (e.g., if the difference between the predicted and actual geospatial location of the object is less than a threshold difference). The autonomous vehicle can then autonomously elect and execute a next navigational action based on the scene, objects in the scene, and predicted trajectories of these objects, such as to reduce probability of future collision with these objects.

11. Autonomous Navigation

Block S160 of the method S100 recites selecting a next navigational action based on the composite scan image; and Block S170 of the method S100 recites autonomously executing the next navigational action. Generally, in Blocks S160 and S170, the autonomous vehicle can implement autonomous localization, perception, and navigation techniques to elect a next navigational action based on mutable and immutable objects detected in the composite sensor image.

12. Next Time Window

The system can repeat this process during each subsequent scan cycle to: generate a next scan image; detect a region of insufficient data in the next scan image; define a new ground area of interest that spans this region; and broadcast a query for supplemental perception data representing this ground area of interest during this scan cycle. In particular, the autonomous vehicle can redefine the ground area of interest and update a time or time window for receipt of supplemental perception data over time, such responsive to the autonomous vehicle moving within a scene and/or as other objects move around the autonomous vehicle.

13. Simultaneous Data Sharing

While the autonomous vehicle requests and downloads supplemental scan data from other vehicles via the ad hoc wireless network, the autonomous vehicle can simultaneously transmit its own sensor data (e.g., compressed and/or truncated 3D scan images) to other vehicles on the ad hoc wireless network, such as by default or as requested by these other vehicles. In particular, the autonomous vehicle can both generate requests for supplemental perception data and respond to queries from other vehicles nearby by transmitting its own sensor data to these other vehicles in (near) real-time.

14. Remote Management

In one variation, supplemental perception data requests and data distribution between autonomous vehicles within one autonomous vehicle fleet or across multiple different autonomous vehicle fleets is managed by a remote computer system, such as a computer network or remote server.

In one implementation, autonomous vehicles within an autonomous vehicle fleet automatically return perception data, their geospatial locations and orientations, their planned routes, etc. to the remote computer system, such as via a persistent cellular network as described above. The remote computer system can then track these autonomous vehicles, implement methods and techniques described above to determine which of these autonomous vehicles may benefit from access to all or some supplemental perception data collected from other vehicles in the fleet (e.g., based on one or more triggers described above), and then distribute these supplemental perception data to these autonomous vehicles accordingly via the cellular network.

In a similar implementation, while operating autonomously within a geographic region, an autonomous vehicle implements methods and techniques described above to define a ground area of interest based on a scan image generated at a particular time and to generate a query for supplemental perception data within this ground area of interest. The autonomous vehicle then returns this query to the remote computer system via a wireless network. Over time, the remote computer system tracks geospatial locations of a set of other vehicles within the same geographic region. For each vehicle in this set of vehicles, the remote computer system estimates a sensible area around the vehicle that falls within a field of view of a suite of sensors on the vehicle at approximately the particular time based on a geospatial location of the vehicle at approximately the particular time. The remote computer system then selects a particular vehicle—from the set of vehicles—to respond to the autonomous vehicle's query based on a particular sensible area estimated for the particular vehicle that is predicted to intersect the ground area of interest defined in the query. The remote computer system then: retrieves supplemental perception data for the particular time from the particular vehicle via the wireless network; and transmits these supplemental perception data to the autonomous vehicle via the wireless network accordingly. In this implementation, the autonomous vehicle can regularly update the ground area of interest, such as during each subsequent scan cycle. The computer system can continue to: track geospatial locations of the autonomous vehicle and the particular vehicle; verify that the sensible area estimated for the particular vehicle intersects the ground area of interest defined by the autonomous vehicle; and continue to direct perception data received from the particular vehicle to the autonomous vehicle in (near) real-time. However, once the ground area of interest specified by the autonomous vehicle falls outside of the sensible area estimated for the particular vehicle, the remote computer system can cease transmission of supplemental perception data from the particular vehicle to the autonomous vehicle.

In this variation, the remote computer system can therefore: function as a gateway for perception data sharing between different vehicles within the same autonomous vehicle fleet or different autonomous vehicle fleets; and can monitor geospatial locations, perception data augmentation needs, and sensor fields of to manage distribution of perception data between these autonomous vehicles.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a human annotator computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method comprising:
   obtaining scan data of a scene around an autonomous vehicle at a first time;
   identifying a ground area of interest in the scan data, the ground area of interest corresponding to insufficient perception data in the scan data;
   sending a query for perception data corresponding to the ground area of interest;
   receiving supplemental perception data of the scene captured by a vehicle, the vehicle selected from a set of vehicles to respond to the query based on a sensible area around the vehicle estimated to intersect the ground area of interest, the sensible area estimated based on a geospatial location of the vehicle at approximately the first time;
   forming a composite scan image by incorporating the supplemental perception data into the scan data, the supplemental perception data representing objects within the ground area of interest detected by the vehicle at approximately the first time;
   determining a navigational action based on the composite scan image; and
   autonomously executing the navigational action.

2. The method of claim 1, wherein the supplemental perception data is received from the vehicle directly via a wireless connection.

3. The method of claim 1, wherein the supplemental perception data captured by the vehicle is received via a transmission until the ground area of interest is outside of the sensible area estimated for the vehicle.

4. The method of claim 1, further comprising:
   identifying a second ground area of interest;
       receiving second supplemental perception data corresponding to the second ground area of interest;
       forming a second composite scan image based on the second supplemental perception data; and
       estimating a trajectory of an object near the scene based on a change in position of the object from the composite scan image to the second composite scan image.

5. The method of claim 1, wherein the supplemental perception data comprises a segment of a depth map corresponding to the geospatial location of the vehicle, the composite scan image formed by locating the segment of the depth map in the scan data based on the geospatial location of the vehicle.

6. The method of claim 1, wherein the insufficient perception data is identified by identifying a cluster of points in the scan data predicted to represent an object and containing an insufficient quantity of points for identification of a type of the object,—the ground area of interest identified based on a georeferenced boundary containing the cluster of points, the georeferenced boundary determined based on a geospatial location of the autonomous vehicle at the first time.

7. The method of claim 6, wherein the navigational action is determined based on a predicted trajectory of the object.

8. The method of claim 1, wherein the supplemental perception data comprises an object map segment generated by the vehicle, the object map segment specifying types and georeferenced locations of a set of objects within the ground area of interest at approximately the first time, the composite scan image formed by inserting the object map segment into an object map formed from the scan data.

9. The method of claim 8, wherein the object map segment is inserted into the object map with georeferenced boundaries expanded by a buffer distance, each of the georeferenced boundaries corresponding to an object of the set of objects.

10. The method of claim 9, wherein the buffer distance corresponds to an association of the vehicle with an autonomous vehicle fleet comprising the autonomous vehicle.

11. The method of claim 1, wherein a type of the supplemental perception data is received based on a bandwidth of a wireless network, the type of the supplemental perception data including types and locations of objects within the ground area of interest when the bandwidth is below a threshold bandwidth, the type of the supplemental perception data including raw sensor data intersecting the ground area of interest when the bandwidth exceeds the threshold bandwidth.

12. The method of claim 1, wherein the insufficient perception data is identified based on a region of the scan data corresponding to obfuscation of a field of view of a sensor of the autonomous vehicle by an external object in the scene at the first time.

13. The method of claim 1, further comprising:
   obtaining a scan image of the scene at a second time succeeding the first time;
   receiving the supplemental perception data, the supplemental perception data incorporated into the scan data to form the composite scan image; and
   estimating a trajectory of an object near the scene based on a change in position of the object from the composite scan image to the scan image.

14. The method of claim 1, wherein the insufficient perception data is identified based on a particular object in the scene being depicted in the scan data and unrepresented in preceding scan data corresponding to a time preceding the first time.

15. One or more tangible non-transitory computer-readable storage media storing computer-executable instructions for performing a computer process on a computing system, the computer process comprising:
   obtaining scan data of a scene around an autonomous vehicle at a first time;
   identifying a ground area of interest in the scan data, the ground area of interest corresponding to insufficient perception data in the scan data;
   sending a query for perception data corresponding to the ground area of interest;
   receiving supplemental perception data of the scene captured by a vehicle, the vehicle selected from a set of vehicles to respond to the query based on a sensible area around the vehicle estimated to intersect the ground area of interest, the sensible area estimated based on a geospatial location of the vehicle at approximately the first time; and
   forming a composite scan image by incorporating the supplemental perception data into the scan data, the supplemental perception data representing objects within the ground area of interest detected by the vehicle at approximately the first time.

16. The one or more tangible non-transitory computer-readable storage media of claim 15, further comprising:
   determining a navigational action based on the composite scan image; and
   autonomously executing the navigational action.

17. The one or more tangible non-transitory computer-readable storage media of claim 15, wherein the insufficient perception data is identified by identifying a cluster of points in the scan data predicted to represent an object and containing an insufficient quantity of points for identification of the object.

18. The one or more tangible non-transitory computer-readable storage media of claim 17, wherein the ground area of interest identified based on a georeferenced boundary containing the cluster of points, the georeferenced boundary determined based on a geospatial location of the autonomous vehicle at the first time.

19. The one or more tangible non-transitory computer-readable storage media of claim 15, wherein the supplemental perception data received includes a type of the supplemental perception data, the type of the supplemental perception data determined based on a bandwidth of a wireless network.

20. The one or more tangible non-transitory computer-readable storage media of claim 15, wherein the insufficient perception data is identified based on a region of the scan data corresponding to obfuscation of a field of view of a sensor of the autonomous vehicle.

* * * * *